United States Patent [19]
Kang

[11] Patent Number: 5,358,195
[45] Date of Patent: Oct. 25, 1994

[54] REEL BRAKING DEVICE FOR A VIDEO CASSETTE RECORDER

[75] Inventor: Ki-Young Kang, Seoul, Rep. of Korea

[73] Assignee: Daewoo Electronics Co., Ltd., Seoul, Rep. of Korea

[21] Appl. No.: 48,822

[22] Filed: Apr. 16, 1993

[30] Foreign Application Priority Data

Apr. 21, 1992 [KR] Rep. of Korea ............ 92.6701

[51] Int. Cl.$^5$ ............................................. G11B 15/18
[52] U.S. Cl. ............................ 242/343.1; 242/355.1
[58] Field of Search ............... 242/201, 202, 204, 206, 242/208; 360/95, 96.1, 96.2, 96.3, 96.4

[56] References Cited

U.S. PATENT DOCUMENTS

| | | | |
|---|---|---|---|
| 4,730,792 | 3/1988 | Jang | 242/204 |
| 4,747,564 | 5/1988 | Tsubota | 242/204 |
| 4,807,061 | 2/1989 | Yoon | 242/204 X |
| 5,180,117 | 1/1993 | Katohno et al. | 360/95 X |

Primary Examiner—Daniel P. Stodola
Assistant Examiner—John P. Darling
Attorney, Agent, or Firm—William F. Pinsak

[57] ABSTRACT

A braking device for use in a video cassette recorder capable of braking quickly the reels therein comprises: a pair of brake levers disposed adjacent to the reels, a slide plate for actuating the brake levers, a swing lever hinged at a side of the slide plate for moving the slide plate in the lateral direction, a cam gear for rotating the swing lever clockwise and counterclockwise and having a camming groove engaged with a cam follower pin of the swing lever and defining a series of various mode positions, a driving mechanism for driving the cam gear in the various mode positions, a lock arm disposed between the swing lever and the cam gear for locking the swing lever, and a releasing member coupled to the driving mechanism for unlocking the swing lever.

4 Claims, 4 Drawing Sheets

REEL BRAKING DEVICE FOR A VIDEO CASSETTE RECORDER

FIELD OF THE INVENTION

The present invention relates to a reel braking mechanism; and, more particularly, to a reel braking device for use in a video cassette recorder ("VCR"), capable of quickly braking the reels in the VCR during the switching of operation modes.

DESCRIPTION OF THE PRIOR ART

In general, a VCR is operated in various modes, e.g., review mode, stop mode, play mode, fast forward (or rewind) mode and the like. During such operations, need to quickly brake the reels in the VCR arises, e.g., in order to display still images during the fast forward or rewind mode operation. In such a case, the fast forward or the rewind mode is generally converted into the stop mode, via the play mode therebetween due to the structure of a cam gear therein. Accordingly, such intervention of the play mode creates a delay in the braking time of the reels, thereby disrupting or distorting the still images required to be displayed during the fast forward or the rewind mode operation.

In this regard, various braking devices have been proposed to speedily brake the reels of the VCR. For example, U.S. Pat. No. 4,730,792 discloses a braking device for a VCR which comprises braking members operatively connected to a supply reel and a take-up reel, a movable member coupled to the braking members, a connecting plate operatively disposed on the movable member, a rachet engaged with the connecting plate, and a cam for actuating the connecting plate. However, this device is unable to provide a high efficiency braking operation due to the associated complex braking mechanism thereof.

In Korean Utility Model Publication No. 90-3167, there is another reel braking device comprising a pair of brake levers, a movable plate for actuating the brake levers, and a number of complicated structural elements for moving and stopping the movable plate by way of a cam gear. However, such a braking device has the disadvantage in that a number of the complicated structural elements demands a modification of the deck in the VCR and requires additional processes in assembling the device, thereby increasing the manufacturing cost thereof.

SUMMARY OF THE INVENTION

Accordingly, it is an object of the present invention to provide a reel braking device for a VCR capable of braking quickly the reels in the VCR, with a cam gear structurally designed so as to avoid the intervention of the play mode, e.g., during the conversion from the fast forward or the rewind mode to the stop mode.

It is another object of the present invention to provide a reel braking device for enhancing the efficiency of the quick reel braking operation in a VCR.

It is a further object of the present invention to provide a reel braking device for a VCR which can be made at a relatively low cost by simplifying its reel braking mechanism.

The above and other objects of the present invention are accomplished by providing a braking device for use in a VCR with a pair of reels, which comprises: a pair of brake levers disposed adjacent to the reels; a slide plate for actuating the brake levers; a swing lever hinged at a side of the slide plate for moving the slide plate in the lateral direction; a cam gear for rotating the swing lever clockwise and counterclockwise and having a camming groove engaged with a cam follower pin of the swing lever and defining a cassette loading mode position, a tape loading mode position, a review mode position, a stop mode position, a play mode position, a fast forward and rewind mode position, and a brake mode position; means for driving the cam gear in the various mode positions; means disposed between the swing lever and the cam gear for locking the swing lever when the cam follower pin of the swing lever reaches the fast forward and rewind mode position of the camming groove by the rotation of the cam gear; and means for unlocking the swing lever when the cam follower pin of the swing lever begins to leave the fast forward and rewind mode position toward the brake mode position of the camming groove by the rotating actuation of the cam gear.

The camming groove includes a feedback passage arranged between the brake and the play mode positions for guiding the cam follower pin of the swing lever from the brake mode position to the play mode position during the counterclockwise rotation of the cam gear. The feedback passage includes a stepwise portion provided adjacent to the play mode position of the camming groove for preventing the cam follower pin of the swing lever from entering into the feedback passage during the clockwise rotation of the cam gear.

BRIEF DESCRIPTION OF THE DRAWINGS

The above and other objects, and features of the present invention will become apparent from the following descriptions, taken in conjunction with the accompanying drawings, wherein.

DETAILED DESCRIPTION OF THE PREFERRED EMBODIMENTS

Figure 1:
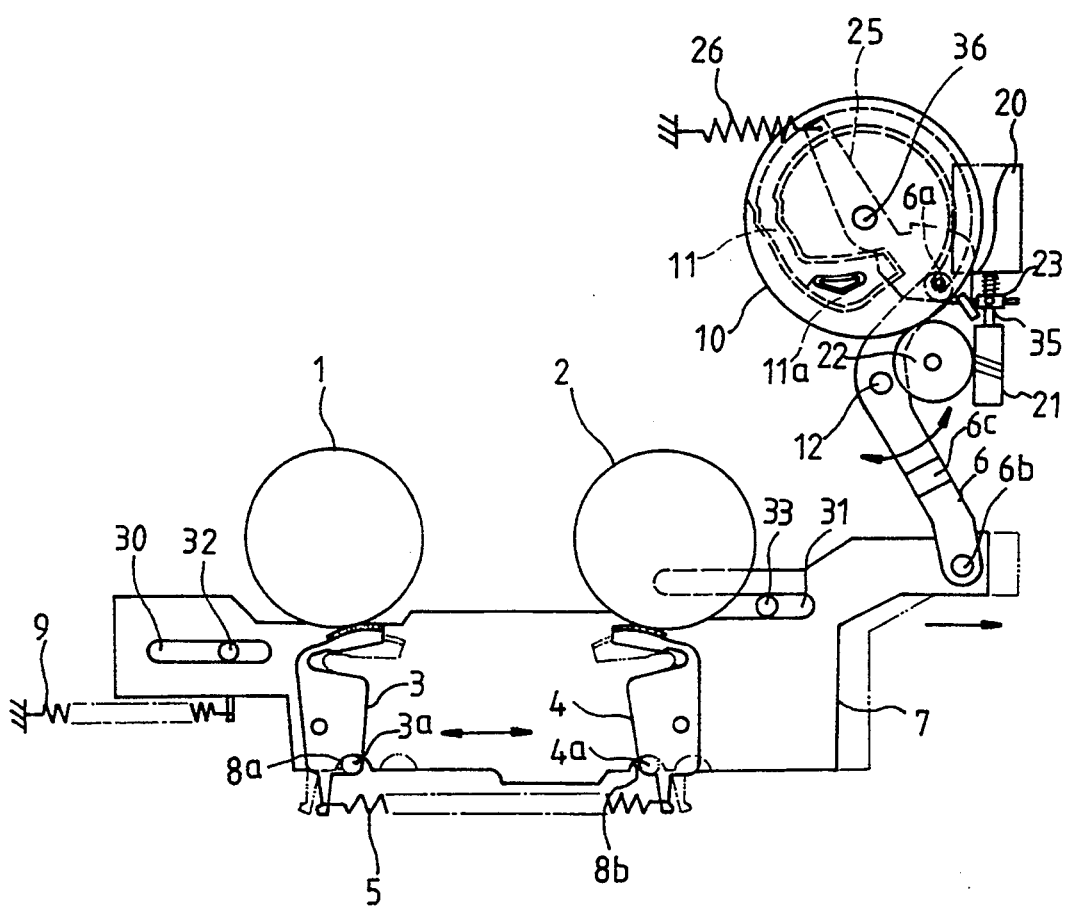
FIG. 1 is a schematic plan view of a reel braking device for a VCR in accordance with a preferred embodiment of the present invention.

Referring now to FIG. 1, there is shown a reel braking device in accordance with a preferred embodiment of the present invention, capable of braking quickly the reels contained in a VCR. The reel braking device comprises a pair of brake levers 3, 4 disposed adjacent to a supply reel 1 and a take-up reel 2, a slide plate 7 for actuating the brake levers 3, 4, a swing lever 6 hinged at a side of the slide plate 7 and pivotally mounted to a pin 12 at a middle portion thereof, and a cam gear 10 for actuating the swing lever 6.

The slide plate 7 has elongated slots 30, 31 engaged with guide pins 32, 33 which serve to guide the left and right movement thereof. Also, the slide plate 7 is biased in the left direction by a coil spring 9 attached thereto. A common tension spring 5 is secured to the ends of the respective brake levers 3, 4, thereby enabling the brake levers 3, 4 to brake the reels 1, 2 by its biasing force. As shown in FIG. 1, provided at a lower portion of the respective brake levers 3, 4 are retainer pins 3a, 4a which are adapted to engage with recesses 8a, 8b formed at the bottom surface 7a of the slide plate 7. With the lateral movement of the slide plate 7, the retainer pins 3a, 4a of the brake levers 3, 4 are engaged with the recesses 8a, 8b of the slide plate 7 to urge the brake levers 3, 4 against the reels 1, 2 by the biasing force of the tension spring 5. When the retainer pins 3a, 4a of the brake levers 3, 4 are disengaged from the recesses 8a, 8a to ride on the bottom surface 7a of the slide plate 7 by the movement of the slide plate 7, the common tension spring 5 is tensed to separate the brake levers 3, 4 from the reels 1, 2.

As illustrated in FIG. 1, the cam gear 10 is actuated by a driving mechanism. The driving mechanism includes a driving gear 21 coupled to an output shaft 35 of a loading motor 20, and a driven gear 22 meshed with both the driving gear 21 and the cam gear 10. Accordingly, the driving force of the loading motor 20 is transferred to the cam gear 10 through the driving and the driven gears 21, 22. In addition, the cam gear 10 has a camming groove 11 which is engaged with a cam follower pin 6a of the swing lever 6. Therefore, the rotation of the cam gear 10 will cause the swing lever 6 to be rotated clockwise or counterclockwise, thereby moving the slide plate 7 in the lateral direction.

Figure 2:
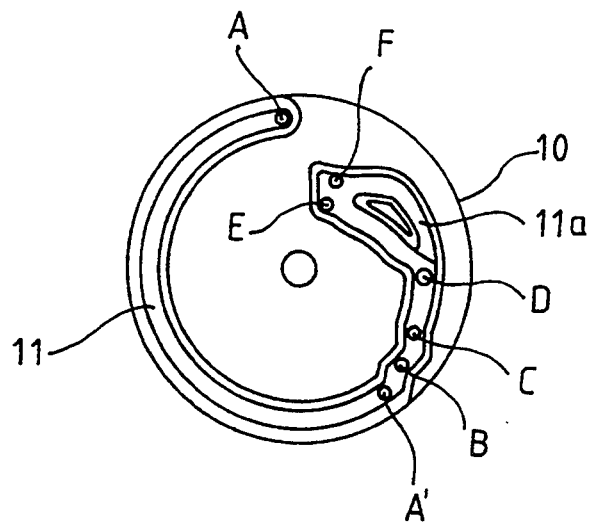
FIG. 2 is a plan view of a cam gear of the reel braking device shown in FIG. 1.

As best shown in FIG. 2, the camming groove 11 is properly designed to switch the operation modes of the VCR. The camming groove 11 defines various operation mode positions along the length thereof, i.e., a cassette loading mode (start) position A, a tape loading mode (completion) position A', a review mode position B, a stop mode position C, a play mode position D, a fast forward and rewind mode position E, and a brake mode position F. In this connection, the radius of the camming groove 11 arranged radially between the cassette and the tape loading mode positions A, A' is constant to thereby enable the swing lever 6 to become stationary during the cassette and the tape loading mode operations of the cam gear 10. The radius of the review mode position B is shorter than that of the tape loading mode position A', thereby causing the slide plate 7 to move in the lateral direction through the rotating actuation of the swing lever 6. A constant radius is also provided between the stop and the play mode positions C, D of the camming groove 11, and, therefore, the slide plate 7 remains stationary irrespective of the rotation of the cam gear 10. The fast forward and rewind mode position E has a smaller radius than the play mode position D. The radius of the brake mode position F is slightly greater than that of the fast forward mode position E.

Figure 3:
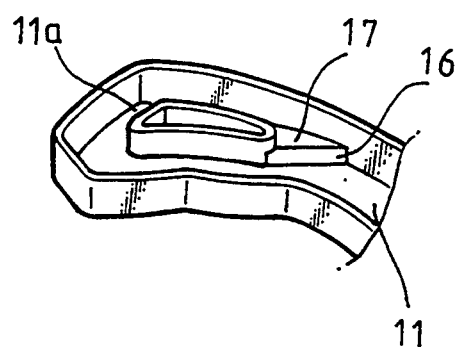
FIG. 3 is an enlarged perspective view of a feedback camming groove of the cam gear shown in FIG. 2.
Figure 6:
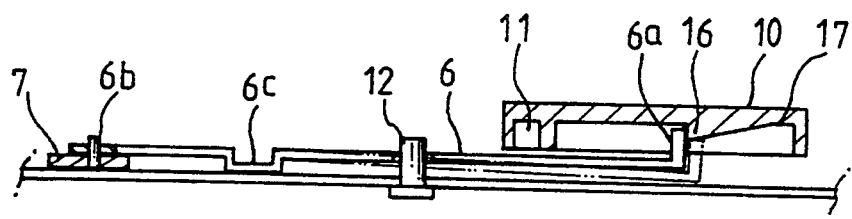
FIG. 6 shows the actuation of a swing lever engaged with the cam gear shown in FIG. 2 when a cam follower pin of the swing lever passes through the feedback camming groove.

As shown in FIG. 2, the camming groove 11 of the cam gear 10 has a feedback passage 11a which connects the brake mode position F with the play mode position D. The feedback passage 11a serves to lead the cam follower pin 6a of the swing lever 6 located at the brake mode position F to the play mode position D in the counterclockwise rotation of the cam gear 10, thereby preventing the return of the cam follower pin 6a to the play mode position D via the fast forward and rewind mode position E. As best shown in FIGS. 3 and 6, formed at the feedback passage 11a is a tapered surface 17 defining a stepwise portion 16 of the camming groove 11, which functions to prevent the cam follower pin 6a of the swing lever 6 from entering into the feedback passage 11a from the play mode position D during the clockwise rotation of the cam gear 10.

Figure 4:
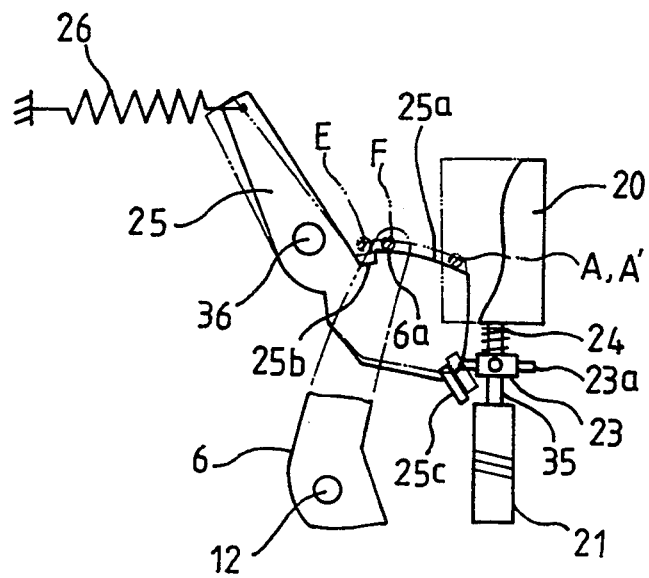
FIG. 4 is a plan view of a lock arm of the reel braking device of FIG. 1.

FIG. 4 shows a lock arm 25 of the reel braking device in accordance with a preferred embodiment of the present invention. The lock arm 25 is disposed between the cam gear 10 and the swing lever 6 and rotatably pivoted at a shaft 36 of the cam gear 10. In addition, the lock arm 25 is urged counterclockwise by a tension coil spring 26 fixed thereto. The lock arm 25 includes a curved surface 25a having a constant curvature with respect to the pin 12 of the swing lever 6, on which the cam follower pin 6a of the swing lever 6 is supported. The cam follower pin 6a is moved along the curved surface 25a of the lock arm 25 during the rotation of the cam gear 10. Additionally, formed adjoining to the curved surface 25a of the lock arm 25 is a locking notch 25b which is engaged with the cam follower pin 6a to thereby lock the swing lever 6 when the cam follower pin 6a of the swing lever 6 reaches the fast forward and rewind mode position E of the camming groove 11 by the rotation of the cam gear 10.

Figure 5:
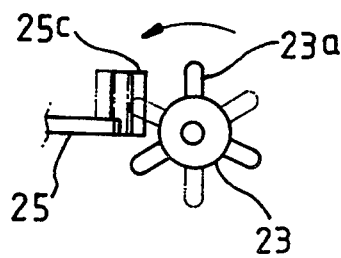
FIG. 5 shows a driving mechanism for actuating the lock arm shown in FIG. 4.

As shown in FIGS. 4 and 5, a projecting plate 25c is attached to a side of the lock arm 25. A driving wheel 23 is coupled to the shaft 35 of the motor 20 by way of a one way clutch spring 24 and disposed in the vicinity of the projecting plate 25c of the lock arm 25. Accordingly, when the loading motor 20 is in the reverse direction, its driving force is transferred to the driving wheel 23 by the actuation of the clutch spring 24. The driving wheel 23 has a plurality of rods 23a arranged thereon, e.g., at about 120 degrees with respect to each other, which can push the projecting plate 25c of the lock arm 25 clockwise against the biasing force of the tension coil spring 26. Accordingly, the clockwise rotation of the lock arm 25 will cause the cam follower pin 6a of the swing lever 6 to be released from the notch 25b, thereby allowing the swing lever 6 to rotate clockwise.

In accordance with a preferred embodiment of the present invention, the reel braking operation will now be described hereinbelow, with reference to the accompanying drawings. As shown in FIG. 1, in an initial stage for loading the cassette in the VCR, the forward drive of the motor 20 commences to rotate the cam gear 10 clockwise through the driving and the driven gears 21, 22. Accordingly, the cassette loading operation initiates at the cassette loading mode position A of the camming groove 11 of the cam gear 10 and, then, the tape loading is completed when the cam follower pin 6a of the swing lever 6 reaches the tape loading mode position A' of the camming groove 11 by the clockwise rotation of the cam gear 10. In this case, the swing lever 6 remains stationary due to the constant radius between the cassette and the tape loading mode positions A, A' of the camming groove 11 (see FIG. 2).

A further rotation of the cam gear 10 will cause the cam follower pin 6a of the swing lever 6 to reach the review mode position B of the camming groove 11. Therefore, the swing lever 6 is rotated counterclockwise about the pin 12 due the shorter radius of the review mode position B than the tape loading mode position A' of the camming groove 11, thereby causing the slide plate 7 to move in the right direction (see FIG. 7). In addition, the cam follower pin 6a of the swing lever 6 is rotated counterclockwise along the curved surface 25a of the lock arm 25 (see FIG. 4).

Consequently, the continuous clockwise rotation of the cam gear 10 enables the cam follower pin 6a of the swing lever 6 to reach the play mode position D of the camming groove 11 via the stop mode position C. In this case, the slide plate 7 does not move due to the stationary operation of the swing lever 6 as the radius of the camming groove 11 between the stop and the play mode positions C, D is constant (see FIG. 7).

Thereafter, the cam follower pin 6a of the swing lever 6 is led to the fast forward and rewind mode position E of the camming groove 11 by the clockwise rotation of the cam gear 10. In addition, such rotation of the cam gear 10 causes the slide plate 7 to move again in the right direction by the counterclockwise rotation of the swing lever 6 as shown in a dotted line (see FIG. 1). The continuous right movement of the slide plate 7 will cause the retainer pins 3a, 4a of the brake levers 3, 4 to be instantaneously positioned in and then disengaged from the recesses 8a, 8b of the slide plate 7. Accordingly, the brake levers 3, 4 become separated from the reels 1, 2. Further, upon reaching the fast forward and rewind mode position E of the camming groove 11, the cam follower pin 6a of the swing lever 6 is locked in the notch 25b by the counterclockwise rotation of the lock arm 25 due to the restoring force of the tensed spring 26 as shown in the dotted line (see FIG. 4).

Figure 7:
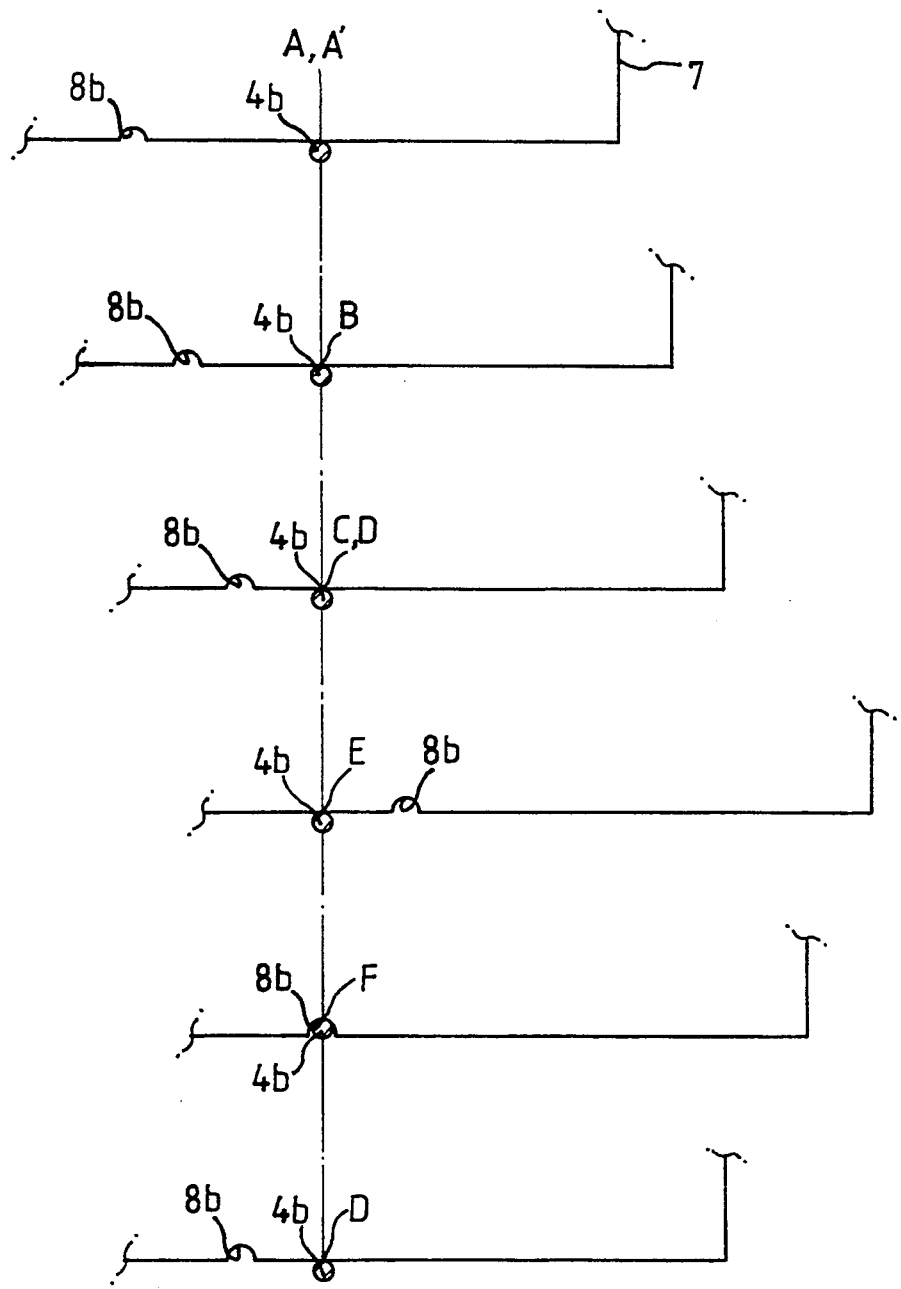
FIG. 7 shows the switching operation of several modes in accordance with the present invention.

On the other hand, in order to display certain required still images during the fast forward or the rewind mode operation of the VCR, it is required to quickly brake the reels 1, 2 of the VCR. In case of switching such modes, the loading motor 20 is rotated in the reverse direction to transmit its driving force to the driving wheel 23 by way of the one-way clutch spring 24 (see FIGS. 4 and 5). As a result, the rotation of the driving wheel 23 will cause the rod 23a of the wheel 23 to push the projecting plate 25c of the lock arm 25, thereby rotating the lock arm 25 clockwise against the biasing force of the tension coil spring 26. Accordingly, the cam follower pin 6a of the swing lever 6 is released from the notch 25b of the lock arm 25. As shown in FIG. 1, the swing lever 6 is subject to the clockwise rotation by the biasing force of the tension spring 9 exerted on the slide plate 7, thereby causing the cam follower pin 6a of the swing lever 6 to quickly move to the brake mode position F of the camming grove 11. Simultaneously with the clockwise rotation of the swing lever 6, the slide plate 7 moves in the left direction due to the restoring force of the tension spring 9 upon the release of the swing lever 5 from the lock arm 25. Accordingly, as shown in FIG. 7, the retainer pins 3a, 4a of the brake levers 3, 4 are engaged with the recesses 8a, 8b of the slide plate 7 to thereby allow the brake levers 3, 4 to brake the reels 1, 2 by the restoring force of the common tension spring 5.

As discussed above, in accordance with the preferred embodiment of the present invention, with the direct conversion of the fast forward or the rewind mode into the brake mode without the intervention of the play mode, the reels 1, 2 can be quickly braked to attain the required still images during the fast forward or the rewind mode operation of the VCR.

Thereafter, if it is required to switch the operation modes, e.g., from the brake mode to the play mode, the continuous reverse drive of the loading motor 20 results in the counterclockwise rotation of the cam gear 10, thereby causing the cam follower pin 6a of the swing lever 6 to reach the play mode position D of the camming groove 11 through the feedback passage 11a of the cam gear 10. As shown in FIG. 6, when the cam follower pin 6a of the swing lever 6 passes through the stepwise portion 16 of the camming groove 11 along the tapered surface 17 of the feedback passage 11a, the swing lever 6 is bent about its hinge point 6c as indicated by the dotted line in FIG. 6 and then is reinstated to its original shape. Additionally, the swing lever 6 is rotated clockwise by the counterclockwise rotation of the cam gear 10 to thereby cause the slide plate 7 to move in the left direction (see FIG. 7). Accordingly, the retainer pins 3a, 4a of the brake levers 3, 4 are disengaged from the recesses 8a, 8b of the slide plate 7, thereby separating the brake levers 3, 4 from the reels 1, 2 of the VCR.

Although the invention has been shown and described with respect to the preferred embodiments, it will be understood by those skilled in the art that certain changes and modifications may be made without departing from the spirit and scope of the invention as defined in the following claims.

What is claimed is:

1. A braking device for use in a video cassette recorder with a pair of reels, which comprises:
    a pair of brake levers disposed adjacent to the reels and biased by a common tension spring for braking the reels and having retainer pins provided at lower end portions thereof;
    a slide plate for actuating the brake levers and having recesses adapted to be engaged with the respective retainer pins of the brake levers by the lateral movement thereof;
    a swing lever hinged at a side of the slide plate and pivotally mounted at a middle portion thereof for moving the slide plate in the lateral direction;
    means for biasing the slide plate so as to urge the swing lever in the clockwise direction;
    a cam gear for rotating the swing lever, said cam gear having a camming groove engaged with a cam follower pin of the swing lever, said camming groove defining a cassette loading mode position, a tape loading mode position, a review mode position, a stop mode position, a play mode position, a fast forward and rewind mode position, and a brake mode position and including a feedback passage arranged between the brake mode and the play mode positions for guiding the cam follower pin of the swing lever from the brake mode position to the play mode position in the counterclockwise rotation of the cam gear;
    means for driving the cam gear, said driving means including a driving gear provided at an output shaft of a loading motor and a driven gear meshed with the driving gear and the cam gear;
    means disposed between the swing lever and the cam gear for locking the swing lever when the cam follower pin of the swing lever reaches the fast forward and rewind mode position of the camming groove by the rotation of the cam gear; and
    means for unlocking the swing lever when the cam follower pin of the swing lever begins to leave the fast forward and rewind mode position toward the brake mode position of the camming groove by the rotating actuation of the cam gear.

2. The braking device of claim 1, wherein said feedback passage includes a stepwise portion provided adjacent to the play mode position of the camming groove for preventing the cam follower pin of the swing lever from entering into the feedback passage during the clockwise rotation of the cam gear.

3. The braking device of claim 2, wherein said means for locking the swing lever includes a lock arm rotatably pivoted at a shaft of the cam gear, said lock arm having a curved surface for supporting the cam follower pin of the swing lever and a notch arranged adjoining the curved surface and adapted to be engaged with the cam follower pin during the location of the cam follower pin at the fast forward and rewind mode position of the camming groove.

4. The braking device of claim 3, wherein said lock arm includes a projecting plate attached to a side portion thereof, and said means for unlocking the swing lever includes a driving wheel coupled to the output shaft of the motor by way of a one way clutch spring and a plurality of rods formed at the driving wheel for pushing the projecting plate to thereby cause the cam follower pin of the swing lever to be disengaged from the notch of the lock arm.

* * * * *